United States Patent [19]

Corday

[11] 4,226,420
[45] Oct. 7, 1980

[54] BINGO GAME FOR THE NON-BRAILLE BLIND

[76] Inventor: Dorothy L. Corday, 48 Gilbert Ct., Wilmington, Del. 19713

[21] Appl. No.: 61,654

[22] Filed: Jul. 30, 1979

[51] Int. Cl.³ .............................................. A63F 3/00
[52] U.S. Cl. ........................... 273/269; 273/DIG. 27; 273/DIG. 30
[58] Field of Search ....... 273/269, 270, 271, DIG. 27, 273/DIG. 30; 35/35 A

[56] References Cited

U.S. PATENT DOCUMENTS

| | | | |
|---|---|---|---|
| 1,546,831 | 7/1925 | Fritz | 273/DIG. 27 X |
| 2,399,041 | 4/1946 | Kleber | 273/DIG. 27 X |
| 2,464,146 | 3/1949 | Mohler | 273/269 |
| 2,523,828 | 9/1950 | Howe | 35/35 A |
| 3,072,407 | 1/1963 | Olson | 273/DIG. 27 X |
| 3,684,288 | 8/1972 | Grace | 273/269 X |

FOREIGN PATENT DOCUMENTS 1409970  10/1975  United Kingdom ...................... 273/270

OTHER PUBLICATIONS

Touch and Learn Book of Numbers, No. 96952, McGraw-Hill, 1966 Catalog.
No. 300S-Show Boat Bingo, 1970 Regal Games Catalog.

Primary Examiner—Harland S. Skogquist
Attorney, Agent, or Firm—John G. Abramo

[57] ABSTRACT

The invention is a bingo game for blind people. The numbers of the bingo card are made from a tactile material having a surface with a hooked nap: The numbers on the card are covered with discs having a looped nap. Participants in the game can include both those who know the braille system and those who do not.

4 Claims, 2 Drawing Figures

BINGO GAME FOR THE NON-BRAILLE BLIND

BACKGROUND OF INVENTION

1. Field of the Invention

This invention relates to a game apparatus, particularly of the type for use in playing the well-known game of bingo. More particularly, this invention relates to a game apparatus to be used by blind persons.

2. Description of the Prior Art

The prior art includes U.S. Pat. No. 1,546,831, issued to L. Fritz, on July 21, 1925; U.S. Pat. No. 2,399,041, issued to J. O. Kleber, Apr. 23, 1946; and U.S. Pat. No. 2,464,146 issued to J. P. Mohler, Mar. 8, 1949. The last mentioned patent is concerned with a bingo board for the blind but involves a braille system for the identification of the numbered positions. The device described by Fritz, also embodies raised numbers in the squares. However, the surface texture of the raised nature of the numbers is undefined.

Opportunities for the blind to participate in parlor games are frequently limited by the fact the participants must be in some way able to identify positions on a game board or action to be taken on a game board through the braille method. Many blind people have been taught the braille system of numbers and letters and can use the system for identifying symbols on game boards. U.S. Pat. No. 2,464,146 to Mohler, embodies the braille system in identifying symbols on a board. However, people who become blind in later years, often do not have the opportunity or ability to learn the braille system and cannot engage in games in which a braille system is required in order to play the game. Surveys have been made to find out just how many blind people are skilled in the reading of braille and at least one survey conducted in England, indicates that 66% of blind people over the age of forty do not read braille. It is expected that the same situation exists in the United States.

The use of raised numbers or letters which the blind person can feel and determine the shape of the symbol by running his fingers over the raised portions have not worked well because it is difficult to determine the shape of a symbol when a smooth surface is presented to a blind person, especially one who has become blind in their latter years and whose sense of touch has diminished making it more difficult to determine the configuration of letters and numbers.

BRIEF SUMMARY OF THE INVENTION

The subject invention is a bingo game apparatus for the blind which is a bingo card in which the squares occupied by the numbers are formed from a tactile material. The tactile material is cloth material having a surface containing hooked nap. The blind person can feel the contours of the letter or number by running his fingers along the roughened edges of the tactile material from which the numbers are formed. Discs formed from cloth material having looped nap on the surface and which adheres to the hooked nap of the numbers are used to mark called numbers. In use, the participant of a bingo game feels the surface of the numbers to determine whether the number called by the caller of the game is present and if it is present, covers it with a disc. The squares are outlined by raised ridges and the diagonal direction on the game apparatus is indicated to the player by a raised ridge located diagonally between the ridges.

DETAILED DESCRIPTION OF INVENTION

Figure 1:
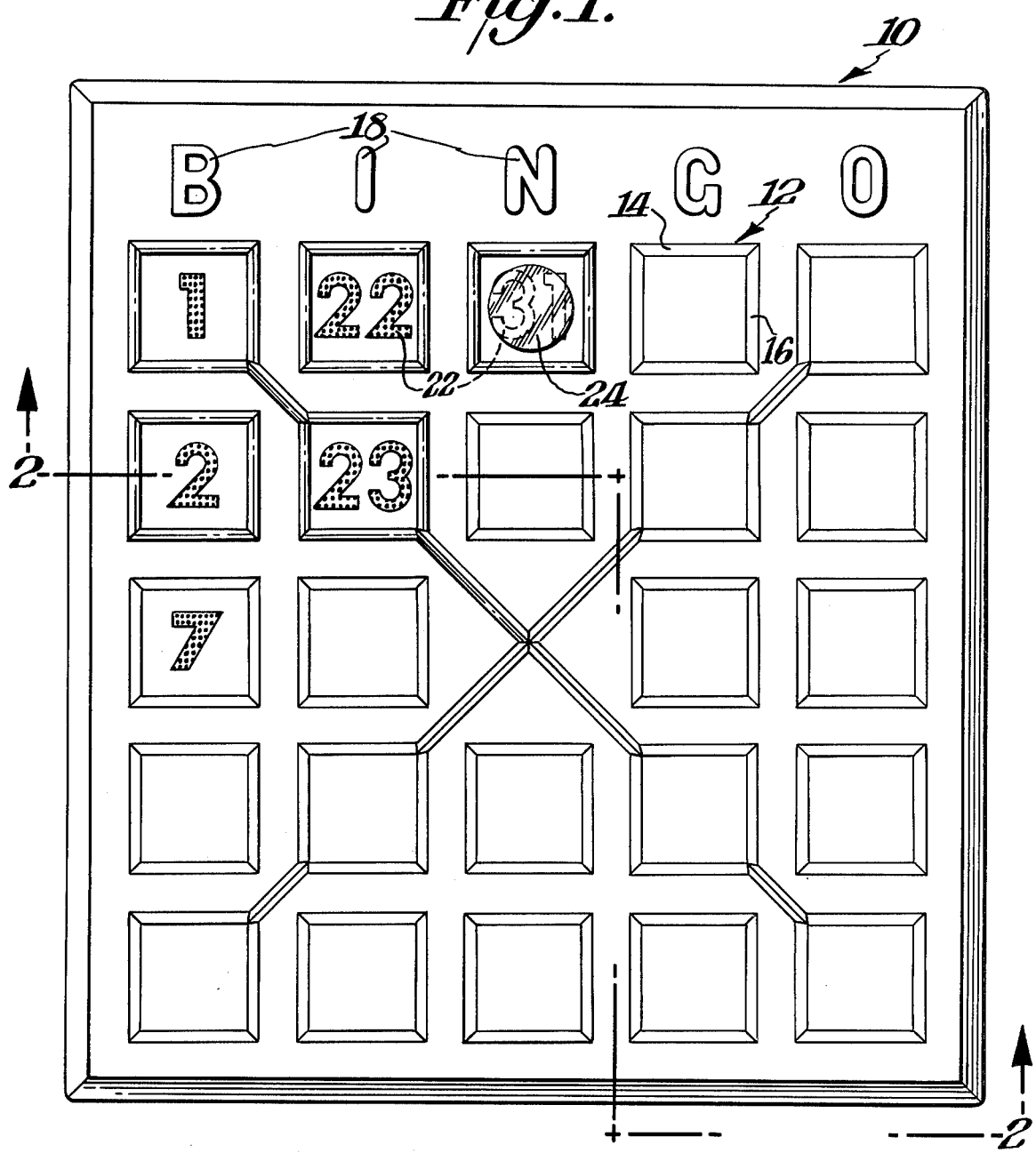
FIG. 1 is a top plan view of a game board.
Figure 2:
FIG. 2 is cross-sectional view taken through FIG. 1 along line 2—2 of the game board with a loop nap disc shown removed from the board.

Referring to FIG. 1 and FIG. 2 of the drawing, a bingo game board 10 is made of any suitable material, usually a plastic. The squares 12 formed from horizontal ridges 14 and vertical ridges 16 relative to the square shape of the game board 10 with the bingo caption 18 at the top of the board. Diagonal ridge 20 aids in directing the fingers of the game participant along the diagonal direction. Numbers 22 are presented in each square and discs 24 are used to cover the numbers 22 on the game board 10 as the caller of a bingo game calls them out to a participant. As in the usual bingo game, when all the numbers 22 in either a vertical, horizontal, or diagonal direction have been called, the participant signals this by calling out "bingo."

The material used to form the numbers 22 and discs 24 is, in the preferred embodiment of this invention, made from two kinds of cloth material which are designed to work together. Preferably, the numbers 22 are formed from cloth material having hooked nap on the surface and discs 24 are formed from cloth material having looped nap. Typical material of this kind is sold under the name "Velcro" which is a trademark for a material in which both the hooked nap and the looped nap is made from nylon fiber.

The marker disc 24 stays in place throughout the game and has the added advantage over the markers usually used on bingo games of not sliding off the board. After the game is completed, the markers can be easily and quickly removed and put away.

Utilizing the tactile number device of this invention allows both the non-braille blind and those who can read braille numbers to participate in the same game, thereby enlarging significantly the social activities of the non-braille blind. If desired, each game card can use both the tactile number system disclosed herein and the braille symbols for numbers in each square. However, the "feel" of the hooked nap material is sufficient for the identification of numbers by blind persons regardless of whether they know the braille system.

While the invention has been described in detail with respect to a particular preferred embodiment, it will be understood by those skilled in the art that various modifications may be made within the scope of the appended claims.

I claim:

1. A bingo game apparatus for the blind comprising:
   (a) A players' board having spaced positions outlined by ridges and within the positions raised numbers wherein the raised numbers consist of tactile material in the form of either hooked nap or looped nap;
   (b) A marker piece having cooperating looped nap or hooked nap adapted to attach to the tactile material which forms the raised numbers whereby non-braille blind people may participate in playing bingo.

2. A device as in claim 1 wherein the tactile material and the marker piece adapted to attach to the tactile material is made of cloth having hooked nap and looped nap respectively.

3. A device as in claim 1 wherein the players' board has a diagonal ridge which guides the fingers of the player along a diagonal direction so they can determine whether the diagonal spaces have been filled.

4. A process for the mutual enjoyment of bingo games by blind persons who know the braille system and for the non-braille blind which comprises:

(a) Identifying raised numbers on a bingo card the numbers being located within spaced positions outlined by ridges by feeling the outline of the raised numbers wherein the numbers are made of tactile material having either hooked nap or looped nap, and.

(b) Marking the numbers called by a caller with discs, having either looped nap or hooked nap on their surface, whereby the nap of the numbers engages and holds on to the nap of the discs.

* * * * *